United States Patent Office 2,849,303
Patented Aug. 26, 1958

2,849,303

ANTIKNOCK COMPOSITIONS

Raymond G. Lyben, Detroit, Mich., assignor to Ethyl Corporation, New York, N. Y., a corporation of Delaware No Drawing. Application May 31, 1955
Serial No. 512,285

7 Claims. (Cl. 44—69)

This invention relates to improved antiknock compositions. These compositions encompass antiknock fluids and leaded fuels. In particular, this invention relates to a class of halohydrocarbons having a particular molecular structure for use as a scavenger with lead antiknock compounds.

With the discovery of the antiknock effectiveness of organolead compounds, in particular alkyllead compounds such as tetraethyllead, it was found that for efficient operation of the engine means must be provided to remove the lead-containing products of combustion. The first advance in this art was the discovery that certain organic halogen compounds, in particular organic chloride and bromides, when co-present with the lead antiknock compound, reacted in the combustion chamber with the combustion products of the lead antiknock to form volatile lead halides. These lead halides during the exhaust cycle were more or less efficiently removed from the combustion chamber. This process has been called scavenging and a material capable of so reacting with lead is referred to as a lead scavenger or, more simply, as a scavenger. Choice of a commercial scavenger to date has been based on commercial availability and cost. Thus, up to the present the only scavengers which have enjoyed any commercial success have been ethylene dibromide and ethylene dichloride. Other halogen-containing compounds proposed as scavengers were those which can be introduced into the combustion chambers of the various cylinders of a multi-cylinder engine in the same proportionate ratio as the tetraethyllead. This can be achieved by employing scavengers which have approximately the same relative volatility in the fuel as the tetraethyllead. These scavengers are known as uniformly volatile scavengers. As before, no consideration was given to chemical or physico-chemical properties as they affect the scavenging function.

It is, therefore, an object of this invention to provide antiknock compositions having improved scavenging properties. It is also an object of this invention to provide antiknock fluids containing improved scavengers. It is likewise an object of this invention to provide fuels containing lead antiknock agents and improved scavengers. It is a further object of this invention to provide means for operating an internal combustion engine with leaded fuels in a manner wherein the advantages of the lead antiknock are utilized to a maximum degree and the disadvantages are minimized. These and other objects of this invention will become apparent from the following description.

The above and other objects are accomplished by providing antiknock fluids and leaded fuels which contain what are termed uniformly stable, double-acting scavengers. These uniformly stable scavengers are mono-(tert-halo)hydrocarbon compounds in which the halogen-bearing carbon atom is attached by single bonds to three other non-aromatic carbon atoms, and in which the halogen has an atomic weight of 35 to 81 hereinafter referred to as mono(tert-halo)hydrocarbon compounds, the compounds being further characterized in that there is at least one hydrogen atom on a carbon which is alpha to the halogen-bearing carbon. In other words, the new scavengers are halohydrocarbons containing only one halogen atom in each compound which is attached to a tertiary carbon atom. Thus, the novel scavenging agents of this invention are mono(t-chloro)hydrocarbons or mono(t-bromo)hydrocarbons.

The halohydrocarbon scavenging agent of this invention can be derived from alkanes, cycloalkanes, alkenes, cycloalkenes and hydrocarbon substituted derivatives thereof. The smallest hydrocarbon radical which can provide a scavenger of this invention contains four carbon atoms. The scavenger in question is tertiary halobutane. In order to provide scavengers having the proper inductibility characteristics with respect to introduction into the combustion chamber of a spark ignition engine through the fuel lines of conventional commercial engines, I prefer to employ uniform stability scavengers having up to 20 carbon atoms. Thus, it will be seen that the carbon content of my scavengers ranges from 4 to 20 carbon atoms per molecule. It is also seen that the scavengers of this invention have a carbon-to-halogen ratio which can vary between 4:1 and 20:1. However, a preferred embodiment of this invention comprises mono(t-halo)hydrocarbons having from 4 to 7 carbon atoms, as compounds of this class possess the required evaporation characteristics in fuel such as to give a suitable pattern of distribution among all the cylinders of a multi-cylinder engine under the intake manifold conditions encountered in vehicles in service. The compounds that fulfill these requirements are mono(t-halo)hydrocarbons having a vapor pressure above about 32 mm. of mercury at 50° C. Therefore, in my preferred class of scavengers the ratio of carbon-to-halogen can vary between 4:1 and 7:1.

Thus, in general, my invention comprises providing halohydrocarbon scavenger-containing organolead antiknock fluids and fuels wherein at least one mole percent of halogen in the scavenger is present in the form of mon-(t-halo)hydrocarbons having from 4 to 20 carbon atoms in which the halogen has an atomic weight of 35 to 81 and is located on a tertiary carbon atom alpha to a carbon having at least one hydrogen attached thereto.

A preferred embodiment of my invention comprises providing halohydrocarbon scavenger-containing lead antiknock fluids and fuels wherein at least one mole percent of halogen in the scavenger is present in the form of mono(t-halo)hydrocarbons having 4 to 7 carbon atoms in which the halogen has an atomic weight of 35 to 81 and is located on a tertiary carbon which is alpha to a carbon having at least one hydrogen attached thereto, said mono(t-halo)hydrocarbon being further characterized in that it has a vapor pressure of at least about 32 mm. of mercury at 50° C.

With all halogen scavengers, the scavenging effect is achieved by decomposition of the scavenger in the engine to form hydrogen halide which then reacts at some point in the combustion cycle with the decomposition product of the lead antiknock compound to form volatile lead halide. Previously known scavengers produce such hydrogen halide only during or after the advance of the flame front. The scavengers of this invention achieve their enhanced effectiveness because they produce the hydrogen halide not only during and after the advance of the flame front but, more significantly, before the passing of the flame front. It has been established that lead antiknock compounds exert their effectiveness by the production in the combustion chamber of a fog of non-halogenated inorganic lead, which is probably lead oxide. This lead oxide fog not only is produced before the advance of the flame front but also exerts its influence on knock-inducing components of the combustion chamber gases prior to their combustion in the flame front. The duration of the effectiveness of these antiknock particles is short, because they agglomerate rapidly and the amount of surface exposed to the reactive fuel-air mixture drops off. For best results the active scavenging chemical, hydrogen halide, should be available shortly after the lead oxide particles have exerted their antiknock effect, but before they have agglomerated into large particles or deposited on the walls of the combustion chamber. In order to accomplish this the scavengers must have a rate of decomposition which is closely related to the decomposition rate of tetraethyllead. Thus, there is a supply of hydrogen halide available for reaction with the lead antiknock decomposition products shortly after they have performed their function as antiknocks. Hence, there is more time for reaction between hydrogen halides and the lead antiknock decomposition products under conditions most favorable to such reaction, namely, in the presence of large amounts of oxygen before a given part of the mixture is consumed by the combustion flame. Because the compounds used as scavengers in this invention have a rate of decomposition which is closely related to that of tetraethyllead, they are called uniformly stable scavengers or, briefly, U. S. scavengers. Of course, any hydrogen halide liberated by the scavenger before the flame but which has not reacted with the lead oxide at that time will still be available for reaction after burning in the same manner as is accomplished by the conventional scavengers. It is for this reason that the scavengers of the instant invention are also called double-acting scavengers.

The scavenger composition of my new antiknock fluid and fuel mixtures can be described in terms of theories of halogen. A theory of halogen is defined as the amount of halogen which is necessary to react completely with the lead present in the antiknock mixture to convert it to lead dihalide. This amount represents two atoms of halogen for every atom of lead present.

The outstanding properties and unexpected advantages of my scavengers can be graphically illustrated by the following statement of results: Using a single cylinder test engine with isooctane fuel containing 13.2 grams of lead as tetraethyllead per gallon and 0.75 theory of bromine as 2-bromo-2-methyl propane, one of the scavengers of this invention, the amount of deposit on the exhaust valve was only 7 percent as compared with the amount of deposit formed when the same fuel was run through the same engine for the same time with no scavenger present. Thus, the amount of deposit removal was 93 percent. When a similar run was made with 0.75 theory of bromine as ethylene dibromide, a conventional scavenger, only 50 percent deposit removal was obtained as compared with the fuel containing lead but no scavenger. The relative effectiveness in deposit removal of my scavenger as compared to the conventional scavenger was therefore 186 percent.

In order to determine the effect of my new scavengers on exhaust valve life, a single cylinder test engine having a combustion chamber displacement of 17.6 cu. in., a compression ratio of 5.6:1, was operated at 2700 R. P. M. on a fuel-to-air ratio of 0.07, using a commercial fuel containing 0.05 percent sulfur and 3 ml. of tetraethyllead together with various halogen compounds as scavengers. When the scavenger was composed of 0.5 theory of bromine as ethylene dibromide, 0.8 theory of chlorine as ethylene dichloride and 0.2 theory of chlorine as tertiary butyl chloride, the average number of hours of operation of the engine until the exhaust valve failed due to burning was 143 hours, calculated on the basis of three runs. The average valve life when the scavenger compounds present are 0.5 theory of bromine as ethylene dibromide and 1.0 theory of chlorine as ethylene dichloride, a conventional scavenger mix, is only 102 hours. Thus, it is seen that replacing part of the chlorine contained as ethylene dichloride in the conventional scavenger mixture with an equivalent amount of chlorine in the form of one of the compounds of this invention results in a valve life which is 140 percent as long as when the conventional scavenger is employed.

Another completely novel and unexpected advantage of the present scavengers is the fact that they actually enhance the antiknock effectiveness of tetraethyllead or other organolead antiknock agents when employed in low concentrations. This was demonstrated in a single cylinder standard knock test engine operated at 900 R. P. M. with the jacket temperature maintained at 300° F. and the fuel-to-air ratio adjusted for maximum knock. When this engine was operated on a primary reference fuel of 80 octane number containing 3.02 grams of lead as tetraethyllead per gallon and 0.25 theory of chlorine as tertiary chloroheptane, a new scavenger of this invention, an actual increase of 10 percent in the effectiveness of the tetraethyllead was observed. That is, the antiknock action of the fuel blended with the new scavenger was equal to the antiknock action that could be achieved by adding an additional 10 percent of tetraethyllead to the fuel used had the mono(t-chloro)hydrocarbon of this invention not been added.

The mono(t-halo)hydrocarbons employed as scavengers according to this invention fall into two categories; one consisting of compounds having 4 to 20 carbon atoms which constitutes the broad class of compounds of this invention; the other category is the preferred class of this invention and comprises compounds having from 4 to 7 carbon atoms in the molecule. Various non-limiting examples of the improved double-acting, uniformly stable scavengers of this invention are as follows:

Typical haloalkane scavengers of this invention include tertiary butyl bromide, tertiary butyl chloride, tertiary pentyl chloride, 3-bromo-3-methylpentane, and the mono-tertiary chloro- and bromo-heptanes, which illustrate the preferred species of the scavengers of this invention. Examples of haloalkane scavengers having more than 7 carbon atoms which are also part of my invention are 2-bromo-2-methylheptane, 2-chloro-2,4-dimethylhexane, 3-bromo-3-ethyloctane, 2-chloro-2-methylpentadecane, 4-bromo-4-t-butylcetane, and the like. It will be noted that in each of the compounds named, there is at least one carbon atom having a hydrogen attached thereto in a position alpha to the halogen-bearing tertiary carbon atom. This is true for all the compounds of this invention.

Typical haloalkenes which constitute scavengers that can be employed according to this invention include 3-bromo-3-methylbutene-1; 3-chloro-3-methylbutene-1; 3-bromo-3-methylpentene-1; 4-chloro-4-methylpentene-1; 3-bromo-3-ethylpentene-1; 4-chloro-4-methylhexene-1; which illustrate one of the preferred groups of this invention. Examples of haloalkenes having more than 7 carbon atoms and which are also part of this invention are 6-bromo-6-methylheptene-3; 5-chloro-3,5-dimethylhexene-1; 6-bromo-6-ethyloctene-1; 5-chloro-5-methylhexadecene-1; 4-bromo-4-tertiary butyl hexadecene-1; and the like.

Non-limiting examples of halocycloalkane scavengers of this invention are 1-bromo-1-methyl cyclopropane; 1-bromobicyclo[2.1.0]pentane; 1-chlorobicyclo[2.2.1]hexane; 1-chloro-1-methylcyclobutane; 1-bromo-1-methylcyclopentane; 1-bromo-1-methylcyclohexane; 1-chloro-1-methylcyclohexane; which constitute a preferred group having from 4 to 7 carbon atoms. Examples of cycloalkane scavengers of this invention having eight or more carbon atoms are 1-bromo-1,3-diethylcyclohexane; 1-bromo-7,7-dimethylbicyclo[2.2.1]heptane; 1-chloro-1,3,5-trimethylcyclohexane; 1-bromo-1-ethylcyclooctane; 1-chloro-1-ethylcyclooctadecane; and the like.

Non-limiting examples of halocycloalkene scavengers of this invention include 3-bromo-3-methylcyclopropane-1; 3-chloro-3-methylcyclobutene-1; 1-bromo-1-methylcyclopentadiene; 1-chloro-1-ethylcyclopentadiene; 3-bromo-3- methylcyclohexene-1, which fall within the preferred class of compounds of this invention and 3-bromo-1,3-dimethylcyclohexene -1; 3 - chloro -1,3,5 - trimethylcyclohexene -1; 4-bromo-4-ethylcyclooctene-1; 6-chloro-6-ethylcyclooctadecene-1; and the like which illustrate compounds having eight or more carbon atoms.

The mono(t-halo)hydrocarbon scavengers of this invention can be prepared by various different methods. One such method is the photohalogenation of a saturated hydrocarbon, as for example, the photobromination of 2-methylpropane to give 2-bromo-2-methylpropane. Another method is the addition of hydrogen halide to a tertiary base olefin. An example of this is the addition of HBr to 2-methylpentene-1 to give 2-bromo-2-methylpentane. Another method is the reaction of hydrogen halide with a tertiary alcohol as in the reaction of tertiary butyl alcohol with HCl to give tertiary butyl chloride. Still other means of synthesis will be apparent to those skilled in the art.

It has been found that the scavengers of this invention can be used in several different formulation or blend types. Principal among these are (a) blends or fluids in which my scavengers are the sole scavenging agents, (b) fluids in which the scavengers are added to conventional antiknock fluids to supplement the scavengers therein, and (c) those in which the scavengers replace a portion of the scavenger in a conventional antiknock fluid. The scavengers of this invention can in general be used in admixture with other scavengers in any proportion within the limits of the amounts of scavenger employed in my antiknock fluids as stated below. Furthermore, mixtures of my scavengers can be so used as well as individual scavengers.

In general, my scavengers can be employed together with any other scavenging agent or mixture of two or more of them. For example, the mono(t-halo)compounds of this invention can be added to organolead antiknock fluids containing 0.5 theory of bromine as ethylene dibromide and 1.0 theory of chlorine as ethylene dichloride or any combination of theories of these two components as, for example, those described in U. S. Patent 2,398,281. The mono(t-halo)compound can also be employed with one theory of bromine as ethylene dibromide or amounts of the latter either greater or less than one theory. Other scavenger compositions that can be employed together with the mono(t-halo)compounds are those having a vapor pressure of substantially 0.2 to 6 mm. of mercury at 50° C. as, for example, the compositions described in U. S. Patents 2,479,900; 2,479,901 and 2,479,903. My scavenging agents can likewise be used with compositions of the kind described in U. S. Patents 2,364,921; 2,479,902; 2,490,606; 2,496,983; etc. It is not intended that mixed scavenger fluids of this invention be limited to mixtures of new scavenger with the above-mentioned conventional scavengers, but they may be employed together with any hydrocarbon fuel-soluble organic halide scavenger compounds consisting of carbon and elements selected from the group consisting of bromine, chlorine, hydrogen, nitrogen and oxygen. In addition, my scavengers can be employed with deposit modifying compounds not containing halogens, for example, organophosphorus compounds and the like. In any event a scavenger of this invention is always present so that the amount of halogen which it provides represents at least one mole percent of total halogen in the scavenger mixture.

In general, good results are obtained when the antiknock mixtures are so composed that the amount of halogen present ranges between 0.1 and 4.0 theories. This includes not only the amount of new scavenger but also the amount of prior art scavenger, if any, so that the above range applies to the total amount of halogen present in the antiknock fluid. For most outstanding results, I prefer that the total amount of halogen be between 0.15 and 2.0 theories, as at least 0.15 theory should be present to give best scavenging results, while not much additional scavenging benefit is obtained when more than 2.0 total theories are employed.

Referring to the three principal blend types listed above, when I use type (a) in which my scavengers are the sole scavenging agents, I prefer to use between 0.1 and 1.5 theories of halogen. For the greatest benefit, I use mono(t-chloro)hydrocarbons to the extent of 0.3 to 1.5 theories and mono(t-bromo)hydrocarbons in amount between 0.15 and 0.75 theory. When a mixture of the chloride and bromide is used, the amount of each will vary according to a relationship which will be shown below.

When I employ either fluid type (b), a fluid in which my new scavengers are added to conventional antiknock fluids to supplement the scavengers therein, or fluid type (c), one in which my scavengers replace a portion of the scavenger in a conventional antiknock fluid, I adjust the amounts of scavenger compounds so that the total halogen is from 0.1 to 4.0 theories, preferably 0.15 to 2.0 theories, and the portion of this which is in the form of my novel scavenger ranges between 0.01 and 1.0 theory, preferably 0.01 to 0.5 theory.

A preferred embodiment of my invention is to employ the mono(t-halo)hydrocarbons along with other scavenger compounds such as other halogen-containing compounds. That is, the mono(t-halo)hydrocarbons can be employed at concentrations at which they enhance the effect of the lead antiknock agent. When used with conventional and other prior art scavengers in this manner, the preferred concentrations of the mono(t-halo)hydrocarbons are in amounts up to about 0.5 theory of halogen based on the lead present. The total amount of halogen due to the various compounds in the scavenger mixture is governed by the equation which is discussed fully hereinbelow. The advantage of using my uniformly stable scavengers with less reactive prior art scavengers is that the latter can be present in larger concentrations to provide scavenging components during and after the passage of the flame front through the gases in the combustion chamber, while the former can be present in amount sufficient to react in part with the deposit forming particles soon after they are formed as described hereinabove, and prior to the passing of the flame front as well as during and after the passage of the flame front. Thus, a combination of two or more different types of compounds of which up to 0.5 theory constitute the mono(t-halo)hydrocarbon scavengers of this invention constitutes a scavenging composition, the deposit minimizing effectiveness of which has not been attained before without bringing in some other deleterious results, such as excessive corrosion and the like.

It has been found that the relative scavenging effectiveness of bromine-containing compounds and chlorine-containing compounds vary depending on the engine operating conditions. Thus, under light load operations as in passenger car service when engine surface temperatures are low, the scavenging efficiency of chlorine-containing compounds is much lower than that of similar bromine-containing compounds. On the other hand, when the engine temperature is relatively high, as is the case in heavy-duty truck operation, the scavenging effectiveness of chlorine in the form of a chlorine-containing compound is considerably higher than under low temperature conditions, while the bromine-containing compounds show a trend in the opposite direction. Taking an overall average over varying engine operating conditions, it may be said that chlorine in the form of a chlorine-containing compound is approximately one-half as effective in removing deposits from exhaust valves and spark plugs as an equivalent number of theories of bromine in the form of a similar bromine-containing compound.

Accordingly, a convenient method for expressing the total number of theories of halogen in a lead-containing antiknock fluid or fuel is in terms of the scavenging effectiveness of bromine. For example, since a chlorine-containing compound is on the average only about one-half as effective a scavenger as a similar bromine-containing compound, it will require about twice as many equivalents of the chloro compound to obtain the same deposit removing effect as of a given amount of a bromine compound. In this regard it should be pointed out that I use the upper limit of 4.0 theories of scavenger when employing only chlorine-containing scavengers (since the same amount of effectiveness is obtained with 2.0 theories of bromine); and by the same token I use the lower limit of 0.1 theory of scavenger when a bromine-containing scavenger is the sole scavenging constituent (since an equivalent amount of chlorine is 0.2 theory). Thus, if X is the number of theories in terms of bromine effectiveness required in a scavenging composition, it is convenient to determine the make-up of a desired fluid with respect to the proportions of chlorine scavenger and bromine scavenger by use of the equation $$\tfrac{1}{2} T_{Cl} + T_{Br} = X$$

In this equation $T_{Cl}$ represents the number of theories of chlorine and $T_{Br}$ represents the number of theories of bromine. The limits set for X correspond to the total bromine scavenging effectiveness desired. Therefore, X can range between 0.1 and 2.0. To determine the composition of a fluid by means of this equation, therefore, I first select the total number of theories of halogen in terms of bromine scavenging effectiveness desired and substitute this number for X in the equation. Then I select the number of theories of either chlorine or bromine which I wish to use. The equation is next solved for the remaining unknown. By this method, the composition of the fluid is determined in so far as the scavenger is concerned.

To illustrate, for example, suppose that it is desired to make up a fluid whose effectiveness in terms of bromine scavenger is equal to 1.5 theories and suppose further that it is desired to use 1.2 theories of chlorine scavenger in this fluid. Placing these numbers in the above equation there is obtained the expression $\tfrac{1}{2}(1.2) + T_{Br} = 1.5$. Solving this equation for $T_{Br}$ it is found that 0.9 theory of bromine scavenger should be used.

The values of X in the above equation can vary from 0.1 to 2.0. Therefore, the equation holds true for values of $T_{Cl}$ ranging from zero to 4.0 while the value of $T_{Br}$ changes from 2.0 to zero. When the new scavengers of this invention are the sole scavenging agents, the preferred range of values for X is 0.15 to 0.75 and the equation will then embody the range of values of the theories of halogen between the upper and lower limits that can be used as stated hereinabove.

The use of the novel scavengers of this invention either alone or in combination with other scavengers possesses a number of advantages in addition to those mentioned above. One advantage is that by using the scavengers of the instant invention a scavenging effect equivalent to that of conventional scavengers can be obtained with a much lower concentration of halogen based on the lead present. For example, a scavenger mixture consisting of one theory of chlorine as ethylene dichloride plus 0.25 theory of bromine as t-butyl bromide has essentially the same effect as 62 Mix which is made up of 1.0 theory of chlorine as ethylene dichloride and 0.5 theory of bromine as ethylene dibromide. This in turn reduces the corrosion effects due to hydrohalic acids on various engine parts such as cylinder walls, intake and exhaust valves, mufflers, etc. On the other hand, when a combination of conventional scavengers and the scavengers of the instant invention are employed in an amount such that the concentration of halogen is equivalent to that commercially in use at present, a greatly increased scavenging effect is obtained. An illustration of this is the substitution of a small amount of a mono(t-halo)hydrocarbon for the halogen compound of 62 Mix to give, for example, an antiknock fluid which contains as scavengers 1.0 theory of chlorine as ethylene dichloride, 0.4 theory of bromine as ethylene dibromide and 0.1 theory of bromine as t-butyl bromide. This antiknock fluid when employed in gasoline in a spark ignition engine shows a marked improvement in scavenging effect over 62 Mix. It can readily be seen that by taking advantage of these various benefits a great deal of flexibility can be achieved in tailor-making fluids to meet any requirement.

In blending the antiknock fluids with fuels I regulate the amount of antiknock fluid so that the amount of lead present in the fuel varies between 0.02 and 13.2 grams per gallon. It is to be understood that I may obtain the finished fuels by blending the various ingredients of my antiknock fluids separately or in any sub-combination with the fuels as well as blending the finished antiknock fluids with the fuels.

The following examples illustrate various antiknock fluids of this invention.

EXAMPLE I

Ninety-eight parts (1.0 theory) of ethylene dichloride, 94 parts (0.5 theory) of ethylene dibromide, and 8.22 parts (0.03 theory) of t-butyl bromide are admixed with efficient stirring with 323 parts of tetraethyllead. This gives an antiknock fluid in which the conventional fluid commonly known as 62 Mix has been supplemented by one of the new scavengers.

To obtain a finished fuel, the above described fluid is blended with gasoline so that the amount of lead present is 0.5 gram per gallon. Use of this fuel in a single-cylinder test engine results in a smaller amount of deposits in the combustion chamber than when equivalent amounts of bromine and chlorine are employed in the form of the ethylene dihalides.

EXAMPLE II

To 323 parts of tetraethyllead is added with good stirring 98 parts (1.0 theory) of ethylene dichloride, 75 parts (0.4 theory) of ethylene dibromide, and 15.1 parts (0.05 theory) of t-pentyl bromide.

To obtain a finished fuel, the above fluid is blended with gasoline so that it is evenly distributed throughout the gasoline and so that the amount of lead present in the gasoline is 7.5 grams per gallon. When this fuel is used in the operation of a single-cylinder aviation-type engine, it is found that even though the halogen content of the scavengers is lower than that commercially in use, no more deposits remain in the combustion chamber.

EXAMPLE III

To 379 parts of tetrapropyllead is added 27.4 parts (0.1 theory) of t-butyl bromide.

This is blended with gasoline in relative amounts so that the finished fuel contains 3.16 grams of lead per gallon. When this fuel is employed in the operation of a spark-fired internal combuston engine, it is found that the deposit scavenging effect of the t-butyl bromide is about twice as high as of an equivalent amount of bromine in the form of a primary halide.

Valuable antiknock fluids are also obtained when Example III is repeated with the amounts of scavenger varying so that the amount of bromine as scavenger is as high as 2.0 theories. For best results it is preferred to blend so that when a mono(t-chloro)hydrocarbon is used, the amount ranges between 0.3 and 1.5 theories of chlorine, and so that when a mono(t-bromo)hydrocarbon is used, the amount of scavenger varies between 0.15 and 0.75 theory of bromine. Examples of fluid compositions of this type are: a mixture of 323 parts of tetraethyllead and 41.1 parts (0.15 theory) of t-butyl bromide; a fluid containing 323 parts of tetraethyllead to 195 parts (0.65 theory) of t-pentyl bromide; a composition which contains 323 parts of tetraethyllead and 72.3 parts (0.3 theory) of 3-chloro-3-methylpentane; and a mixture of 323 parts of tetraethyllead and 350 parts (1.3 theories) of 2-chloro-2-methylhexane. Each of these fluid compositions is blended with hydrocarbon fuels as indicated above to make up a finished fuel.

EXAMPLE IV

To 254 parts of toluene as a solvent containing a blue dye are added 5 parts of 2,6-di-tert-butyl-4-methylphenol, 323 parts of tetraethyllead, 173 parts (0.25 theory) of 2-bromo-2-methylnonadecane and 203 parts (0.5 theory) of 3-chloro-1,3,5-trimethylcyclohexene-1. This provides an antiknock fluid wherein the new scavengers comprise the only scavengers present and wherein the total amount of halogen is 0.75 theory.

This fluid is admixed with gasoline so that the total amount of lead present, which is uniformly distributed throughout the fuel, is 4.22 grams per gallon. When operating road vehicles, it is found that the use of this fuel results in longer valve and spark plug life as well as a lower amount of deposit in the combustion chamber than when an equivalent amount of halogens are employed in the form of conventional scavengers.

I also make blends which consist of tetraethyllead plus two bromo compounds, tetraethyllead plus two chloro compounds, and tetraethyllead plus a chlorine compound and a bromine compound different from those above as, for example, tetraethyllead with 0.3 theory of bromine as t-butyl bromide and 0.35 theory of bromine as 1-bromo-1-methylcyclopentadiene, and tetraethyllead with 0.9 theory of chlorine as t-dodecyl chloride and 0.55 theory of chlorine as 2-chloro-2,3,3-trimethylbutane.

EXAMPLE V

To 323 parts of tetraethyllead is added 188 parts (one theory) of ethylene dibromide and 30.2 parts (0.1 theory) of 2-bromo-2-methylbutane. This composition provides an antiknock fluid wherein the scavengers comprise in part a compound of this invention and the scavenger used in 1-T Mix. The total amount of scavenger is equivalent to 1.1 theories of bromine based on the amount of lead present.

The above fluid is added to gasoline with appropriate agitation so that when uniformly distributed throughout the fuel the concentration of the fluid is equivalent to 2.0 grams of lead per gallon of fuel. The deposit scavenging effect of this scavenger mixture, when the fuel is employed in a commercial multi-cylinder engine, is considerably greater than when an equivalent amount of bromine is made use of in the form of ethylene dibromide.

In like manner, fluids and fuels are prepared containing tetraethyllead together with the scavengers mentioned above in this example. A variation of the scavenger mix used herein is to combine 1 to 0.1 theory of bromine as ethylene dibromide with from 0.01 to 1.0 theory of halogen as a mono(t-halo)hydrocarbon, as, for example, a fluid containing 323 parts of tetraethyllead, 188 parts (1.0 theory) of ethylene dibromide and 3.02 parts (0.01 theory) of t-butyl bromide; gasoline containing 151 parts (0.5 theory) t-pentylbromide and 188 parts (0.1 theory) of ethylene dibromide for every 323 parts of tetraethyllead.

EXAMPLE VI

To 351 parts of diethyl diisopropyllead is added 113 parts (0.6 theory) of ethylene dibromide and 166 parts (0.3 theory) of 2-bromo-2,5-dimethyldodecane, providing an antiknock fluid containing 0.9 theory of halogen based on the lead present.

This fluid is blended with fuel of the gasoline boiling range in amounts such that the concentration of lead is 2.6 grams per gallon. The scavenging effectiveness of the halogen compounds in this fuel is found to be about the same as or better than that of one theory of ethylene dibromide while the corrosion effects have been considerably reduced.

Other fluid and fuel compositions are made up in which the amount of bromine as ethylene dibromide varies from 0.2 to 0.95 theory and the amount of halogen as the highly effective scavengers of this invention varies from 0.05 to 0.8 theory. Examples of other new scavengers that can be mixed with ethylene dibromide are illustrated by compositions such as 0.2 theory of bromine as ethylene dibromide together with 0.8 theory of bromine as 2-bromo-2-methylhexane, 0.6 theory of bromine as ethylene dibromide and 0.3 theory of chlorine as 3-chloro-3-ethyloctane, and the like.

EXAMPLE VII

To 419 parts of diphenyldiethyllead is added 90.6 parts (0.3 theory) of 2-bromo-2-methylbutane and 82.6 parts (0.4 theory) of 1,2,3-tribromopentane. This constitutes an antiknock fluid wherein the scavenger consists of two components, one of which is the new scavenger of this invention and the other is a member of the class known as uniformly volatile scavengers.

The antiknock fluid is blended with fuel of the gasoline boiling range in amount such that the concentration of lead is 5.0 grams per gallon. The scavenger mixture employed herein has the advantage of a combination of a halogen compound which has a volatility closely related to that of the lead compound so as to be distributed in the various cylinders of a multi-cylinder engine in about the same relative proportions as the lead antiknock agent, and also a scavenger which has a rate of decomposition of the same order of magnitude as that of the lead compound. This results in less deposits, as well as longer spark plug and valve life than a mix using conventional scavengers.

Other combinations that can be employed using the very effective compounds of this invention and the uniformly volatile compounds of the type described in U. S. 2,479,900 are 1.0 theory of chlorine as 2-chloro-2-methyl-5-ethyloctane and 2.0 theory of bromine as 6-bromo-4(bromoethyl)heptene-1; 0.1 theory of bromine as 2-bromo-2-methyl-4-phenylhexane and 0.2 theory of chlorine as 5,6-dichloro-3,3-dimethylhexane, etc.

EXAMPLE VIII

To 323 parts of tetraethyllead is added 21.9 parts (0.05 theory) of 4-bromo-3-methyl-4-ethylheptane-1 and 437 parts (2.90 theory) of 4-chloro-1-($\beta$-chloroethyl) benzene. This provides an antiknock fluid wherein a scavenger of this invention is employed together with a UV scavenger of the type embodied in U. S. 2,479,901, of which the latter is a monohaloalkyl benzene compound having 8 carbon atoms with a chlorine attached to the benzene ring and having a vapor pressure in the range of from 0.2 to 6.0 mm. of mercury at 50° C.

This antiknock fluid is mixed with gasoline in proportions to give a concentration of 0.02 gram of lead per gallon of the fuel. I also make blends of fluids and fuels containing tetraethyllead and a mixture of the uniformly volatile scavengers together with compounds of this invention. Examples of these are: tetraethyllead with 0.5 theory of chlorine as 2-chloro-2,5-dimethyl-6-cyclohexylhexane and 3.5 theory of mixed dichloroxylenes; 0.01 theory of bromine as 2-bromo-2,4-dimethyl-5-naphthylpentane and 1.0 theory of bromine as 2-bromo-1,3-dimethyl benzene with leadtetraethyl; and the like. Fuels containing these scavenger mixes give engine operating characteristics similar to those obtained by the use of fuels blended as in Example VII.

EXAMPLE IX

To 267 parts of tetramethyllead in 200 parts of kerosene containing a dye and a small amount of a commercial antioxidant is added 433 parts (0.75 theory) of 3-chloro-3,5-diethylcetane and 126 parts (1.0 theory) of 3,4,6-trichloro-1,2-dimethylbenzene. This results in an antiknock fluid wherein the scavengers of this invention are employed together with uniformly volatile scavengers of the kind embodied in U. S. 2,479,903.

To make up a fuel for internal combustion spark ignition engines, the above fluid is blended with hydrocarbons of the gasoline boiling range in proportions such that the concentration of lead is 3.1 grams of lead per gallon. This fuel gives performance characteristics similar to the fuels of Examples VII and VIII.

Blends of fluids and fuels are also made up wherein the lead compound is dimethyldiethyllead and the scavengers comprise such combinations as 0.1 theory of bromine as 2-bromo-2-methylhexane and 1.8 theories of chlorine as 1,2,3-trichlorobenzene; 0.6 theory of chlorine as 2-chloro-2,4,4,6-tetramethyloctane and 1.5 theory of chlorine as 3,4-dichlorocumene. The uniformly volatile scavengers used herein have a vapor pressure in the range of 0.2 to 6.0 ml. of mercury at 50° C.

EXAMPLE X

To 323 parts of tetraethyllead is added 94 parts (0.5 theory) of ethylene dibromide, 99 parts (1.0 theory) of ethylene dichloride, and 15.1 parts (0.05 theory) of 2-bromo-2-methylbutane. The antiknock fluid thus prepared is then blended with a fuel of the gasoline boiling range in amount such that the concentration of lead is 3.17 grams of lead per gallon. The deposit scavenging effect of the halogen compounds when this fuel is employed in a multi-cylinder engine, is found to be greater than of a fuel in which an equivalent amount of bromine is present as ethylene dibromide.

Other compositions are also prepared in which the amount of scavenger in the fluid and/or fuel, based on the amount of lead present, is illustrated by compositions, such as 0.5 theory of bromine as ethylene dibromide, 1.0 theory of chlorine as ethylene dichloride and 0.1 theory of chlorine in the form of 2-chloro-2,3-dimethylbutane; 0.5 theory of bromine as ethylene dibromide, 1.0 theory of chlorine as ethylene dichloride together with 0.03 theory of bromine as 2-bromo-2-methylhexane and 0.04 theory of chlorine as 2-chloro-2,3-dimethylbutane.

EXAMPLE XI

To 323 parts of tetraethyllead is added 47 parts (0.25 theory) of ethylene dibromide, 99 parts (1.0 theory) of ethylene dichloride and 52.8 parts (0.175 theory) of 2-bromo-2-methylbutane. The fluid thus prepared is blended with hydrocarbons of the gasoline fuel boiling range in amount such as to give a concentration of 2.8 grams of lead per gallon. This fuel displays a very efficient scavenging effectiveness.

In like manner, antiknock fluid and fuel compositions are prepared in which the scavenger compositions are: 0.45 theory of bromine as ethylene dibromide, 1.0 theory of chlorine as ethylene dichloride and 0.075 theory of bromine as 6-bromo-2,4,6,8,10,12-hexamethyltetradecane; and 0.9 theory of bromine as ethylene dibromide, 0.6 theory of chlorine as ethylene dichloride and 0.05 theory of bromine in the form of 2-bromo-2,4,4,6-tetramethyl cetane.

EXAMPLE XII

To 323 parts of tetraethyllead is added 75.5 parts (0.25 theory) of 2-bromo-2-methylbutane and 62.5 parts (0.25 theory) of 2-bromoethanol-1. This mixture is thoroughly agitated to insure even distribution of the scavenger in the tetraethyllead fluid. The fluid is then blended with a hydrocarbon fuel of the gasoline boiling range in amount such as to give a concentration of 4.0 grams of lead per gallon of fuel.

Fluid and fuel compositions are also made up in which the scavenger content is composed of compositions, such as 0.1 theory of bromine as 2,5-dibromo-2,5-dimethylhexane; 0.15 theory of bromine as tertiary butyl bromide; 0.1 theory of chlorine as 3,5-dichloroheptane; 0.5 theory of bromine as diethyldibromomalonate and 0.15 theory of bromine as 1-bromo-1-phenylethane. Mixtures of any combination of two or more of these scavengers can also be used with better results in scavenging effectiveness being achieved than when the compound of this invention is not included.

The scavenging efficiency of the mono(t-halo)hydrocarbons of this invention is demonstrated by the low deposit remaining when single-cylinder laboratory engines were operated on leaded fuels containing these scavengers. The engines were standard CFR L-head engines operated at full throttle at 900 R. P. M. with a fuel-to-air ratio of 0.082. The fuel was isooctane containing 12.5 ml. of tetraethyllead (13.2 g.) per gallon together with a scavenger. The amount of fuel consumed per run was 7 lbs., 14 oz. The results obtained are illustrated by the following table. The percent deposit remaining is corrected to the values corresponding to 0.75 theory of bromine for bromine compounds and to 1.50 theories of chlorine for chlorine compounds, except where mixtures of two or more scavengers are employed. In the latter case, the actual amount of deposit remaining is shown.

Table

| Halohydrocarbon | Theories of halogen | Deposit on exhaust valve, mg. Pb | Percent deposit remaining |
|---|---|---|---|
| No scavengers: Tetraethyllead only | 0 | 180.0 | 100 |
| *Part I* | | | |
| Scavengers of this invention: | | | |
| 2-bromo-2-methylpropane | 0.75 | 12.0 | 7 |
| 2-bromo-2-methylbutane | 0.71 | 16.3 | 6 |
| Mono(t-bromo)heptane | 0.70 | 35.1 | 16 |
| 2-chloro-2-methylpropane | 1.50 | 22.9 | 13 |
| 2-chloro-2-methylbutane | 1.46 | 22.3 | 9 |
| Mono(t-chloro)heptane | 1.61 | 31.4 | 24 |
| Prior art scavengers: | | | |
| 1,4-dibromobutane | 0.76 | 86.6 | 49 |
| 1,1-dibromoethane | 0.76 | 83.0 | 49 |
| Ethylene dibromide | 0.77 | 89.6 | 50 |
| 1,1-dichloroethane | 1.51 | 84.1 | 48 |
| Ethylene dichloride | 1.53 | 91.0 | 52 |
| 1,3-dichloropropane | 1.47 | 92.9 | 51 |
| 1-chlorobutene | 1.48 | 89.7 | 49 |
| Ethylene dibromide plus | 0.375 | 83.0 | 51 |
| Ethylene dichloride | 0.75 | | |
| Ethylene dibromide plus | 0.45 | 82.8 | 46 |
| Ethylene dichloride | 0.75 | | |
| *Part II* | | | |
| Mixtures of new and prior art scavengers: | | | |
| Ethylene dibromide plus | 0.375 | 70.2 | 39 |
| Tert-butyl chloride | 0.75 | | |
| Tert-butyl bromide plus | 0.375 | 57.6 | 32 |
| Ethylene dichloride | 0.75 | | |
| Tert-butyl bromide plus | 0.45 | 36.0 | 20 |
| Ethylene dichloride | 0.75 | | |
| Tert-butyl bromide plus | 0.075 | 68.4 | 38 |
| Ethylene dibromide plus | 0.375 | | |
| Ethylene dichloride | 0.75 | | |
| Ethylene dibromide plus | 0.50 | 7.7 | 4 |
| Ethylene dichloride plus | 0.50 | | |
| Tert-butyl chloride | 0.50 | | |
| Prior art scavenger mixture: | | | |
| Ethylene dibromide plus | 0.50 | 12.8 | 7 |
| Ethylene dichloride | 1.00 | | |

Other representative compounds of this invention that show similarly high deposit removal efficiency include 3-bromo-3,4,5,6-tetramethyloctane; 4-bromo-4-methyl-3,3-diethylhexene-1; 2-chloro-4,5,6,6-tetramethyl-2,3,3,7-tetraethyloctane; 2-bromo-2,3-dimethyl-5-cyclohexylpentane; and 2-chloro-2,4-dimethyl-6-phenylhexane.

From a comparison of the values of deposit remaining given in the table, it is seen that the scavenging agents of this invention are as much as 196 percent as effective as the compounds of the prior art in removing deposits.

When, in a mixture of prior art scavengers consisting of 0.5 theory of bromine and 1.0 theory of chlorine as the ethylene dihalides, 0.5 theory of the chlorine is replaced with an equivalent amount in the form of a mono(t-halo) compound of this invention and the amount of deposit remaining is reduced from 7 to 4 percent. This is a reduction of 43 percent in the amount of deposit left by the prior art scavenger and further illustrates the advantage of employing the compounds of this invention in mixture with other scavengers.

In addition to the tests tabled above, it is found that replacing one-half of the bromine in 62 Mix with a mono(t-halo)hydrocarbon of this invention increases the exhaust valve life by 37 percent, and the combustion chamber deposit accumulation rate is reduced by more than 35 percent. Other tests show that the average time to failure of three spark plugs is increased by 40 percent upon replacement of all the bromine in 62 Mix with t-butyl bromide.

In addition to the benefits given above upon employing the deposit scavenging compounds of this invention, it is also found that the use of many of these scavengers minimizes the octane requirement increase of engines operated on commercial fuels. This increase in octane requirement is a phenomenon observed as the time of operation of an engine is lengthened. It is due to deposits which are built up in various parts of the combustion chamber with the result that a fuel of a quality higher by several octane numbers is required to provide a performance equivalent to that of a clean engine or combustion zone. The mono(t-halo)hydrocarbon scavengers of this invention minimize this octane requirement increase.

The antiknock composition of this invention may contain other components besides lead antiknock compounds and the mono(t-halo)alkyl compounds as scavengers. Such other components may be solvents, such as toluene or kerosene, or other hydrocarbons. They may also contain dyes which are often used for purposes of identification of fluids. Likewise, metal deactivators, phosphorus compounds, other antiknock agents, such as amines and metal carbonyls, antirust and anti-icing agents, and wear inhibitors, may also be added to the antiknock composition or fuel containing the same. In like manner, the fuels to which the antiknock compositions of this invention are added may have a wide variation of composition. These fuels generally are petroleum hydrocarbons and are usually blends of two or more components. These fuels can contain all types of hydrocarbons, including paraffins, both straight and branched-chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbon, including thermally cracked, catalytically-cracked, reformed fractions, etc. The boiling range of the components of the gasoline can vary from 0 to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at a particular intermediate temperature.

The hydrocarbon fuels in which the antiknock agent of this invention can be employed often contain minor quantities of various impurities. One such impurity is sulfur, which can be present either in a combined form as an organic or inorganic compound or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

The scavengers of this invention may be used with organolead or hydrocarbolead compounds in general. Examples of such compounds, including tetraalkyllead and alkylaryllead compounds containing from 4 to 32 carbon atoms other than tetraethyllead, are tetrapropyllead, dimethyldiethyllead, methyltriethyllead, diethyldiphenyllead, tetrabutyllead, tetraoctyllead, and the like, as well as mixtures of these compounds. The amount of lead compounds employed will vary from about 0.02 to 13.2 grams of lead per gallon, depending on the engine it is to be used in and the kind of fuel employed.

Having fully described the nature of the improved antiknock fluids and fuels obtained according to this invention, it is not intended that this invention be limited except within the scope of the appended claims.

I claim:

1. A halohydrocarbon scavenger-containing organolead antiknock fluid wherein at least one mole percent of halogen in the scavenger is present in the form of mono(t-halo)hydrocarbons having 4 to 20 carbon atoms in which the halogen is of atomic weight 35 to 81 and is on a tertiary carbon atom alpha to a carbon atom having at least one hydrogen atom attached thereto; the total amount of said halogenated organic compound scavenger being in the range of 0.1–4.0 theories based on the amount of organolead compound present and the total amount of said mono(t-halo)-hydrocarbon being in the range of 0.01–1.5 theories based on the amount of organolead compound present; a theory being that amount of scavenger which provides two atoms of halogen for every lead atom present in said fluid.

2. The composition of claim 1 wherein said mono(t-halo)-hydrocarbon scavenger is a mono(t-chloro)alkane having 4 to 7 carbon atoms.

3. The composition of claim 1 wherein said mono(t-halo)-hydrocarbon scavenger is t-butyl chloride.

4. A halohydrocarbon scavenger-containing tetraethyllead antiknock fluid wherein the scavenger components consist essentially of 0.5 theory of bromine as ethylene dibromide, 0.5 theory of chlorine as ethylene dichloride, and 0.5 theory of chlorine as t-butyl chloride; a theory being that amount of scavenger which provides two atoms of halogen for every lead atom present in said fluid.

5. A petroleum hydrocarbon fuel of the gasoline boiling range containing the composition of claim 1 in amount such that the lead content is between about 0.02 and 13.2 grams of lead per gallon of fuel.

6. A petroleum hydrocarbon fuel of the gasoline boiling range containing the composition of claim 1 in amount such that the lead content is between about 0.02 and 13.2 grams of lead per gallon of fuel and wherein the mono(t-halo)hydrocarbon is a chloroalkane having 4 to 7 carbon atoms.

7. A petroleum hydrocarbon fuel of the gasoline boiling range containing the antiknock fluid composition of claim 4.

References Cited in the file of this patent

UNITED STATES PATENTS

| | | |
|---|---|---|
| 2,479,900 | Calingaert et al. | Aug. 23, 1949 |
| 2,610,112 | Chenicek | Sept. 9, 1952 |

FOREIGN PATENTS

| | | |
|---|---|---|
| 563,997 | Great Britain | Sept. 8, 1944 |
| 146,054 | Australia | Apr. 15, 1952 |